United States Patent
Abe et al.

(10) Patent No.: US 9,604,282 B2
(45) Date of Patent: Mar. 28, 2017

(54) METHOD FOR MANUFACTURING THREE-DIMENSIONAL SHAPED OBJECT

(71) Applicant: PANASONIC INTELLECTUAL PROPERTY MANAGEMENT CO., LTD., Osaka (JP)

(72) Inventors: Satoshi Abe, Osaka (JP); Masataka Takenami, Osaka (JP); Isamu Matsumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/439,523

(22) PCT Filed: Jul. 9, 2014

(86) PCT No.: PCT/JP2014/068846
§ 371 (c)(1),
(2) Date: Apr. 29, 2015

(87) PCT Pub. No.: WO2015/005496
PCT Pub. Date: Jan. 15, 2015

(65) Prior Publication Data
US 2015/0298211 A1    Oct. 22, 2015

(30) Foreign Application Priority Data
Jul. 10, 2013    (JP) .................................. 2013-144280

(51) Int. Cl.
*B33Y 40/00*    (2015.01)
*B22F 3/105*    (2006.01)
(Continued)

(52) U.S. Cl.
CPC .............. *B22F 3/1055* (2013.01); *B22F 3/24* (2013.01); *B29C 67/0077* (2013.01);
(Continued)

(58) Field of Classification Search
CPC .... B22F 3/24; B22F 3/1055; B22F 2003/247; B22F 2003/1059; B29C 67/0077;
(Continued)

(56) References Cited

U.S. PATENT DOCUMENTS 5,597,589 A    1/1997    Deckard
6,103,160 A *  8/2000    Uchida .................. B28B 1/008
                                                            264/112
(Continued)

FOREIGN PATENT DOCUMENTS

CN    1347783    5/2002
CN    101511509    8/2009
(Continued)

OTHER PUBLICATIONS

Office Action issued in China Counterpart Patent Appl. No. 201480002867.9, dated Sep. 2, 2015 , along with an English translation thereof.
(Continued)

*Primary Examiner* — Jessee Roe
*Assistant Examiner* — Anthony Liang
(74) *Attorney, Agent, or Firm* — Greenblum & Bernstein, P.L.C.

(57) ABSTRACT

There is provided a selective laser sintering method capable of reducing the trouble in chipping or breakage of the machining tool and the like. The manufacturing method according to an embodiment of the present invention is a method for manufacturing a three-dimensional shaped object by repetition of a powder-layer forming and a solidified-layer forming, the repetition including the steps of (i) forming a solidified layer by irradiating a predetermined portion of a powder layer with a light beam, thereby allowing a sintering of the powder in the predetermined portion or a melting and subsequent solidification thereof,
(Continued)

and (ii) forming another solidified layer by newly forming a powder layer on the resulting solidified layer, followed by the irradiation of a predetermined portion of the powder layer with the light beam.

7 Claims, 17 Drawing Sheets

(51) Int. Cl.
*B29C 67/00* (2017.01)
*B22F 3/24* (2006.01)
*B33Y 10/00* (2015.01)

(52) U.S. Cl.
CPC ...... *B29C 67/0085* (2013.01); *B29C 67/0096* (2013.01); *B22F 2003/1059* (2013.01); *B22F 2003/247* (2013.01); *B33Y 10/00* (2014.12); *B33Y 40/00* (2014.12)

(58) Field of Classification Search
CPC . B29C 67/0085; B29C 67/0096; B33Y 10/00; B33Y 40/00
See application file for complete search history.

(56) References Cited

U.S. PATENT DOCUMENTS

| | | | |
|---|---|---|---|
| 7,347,682 | B2 | 3/2008 | Lohner et al. |
| 7,740,797 | B2 | 6/2010 | Abe et al. |
| 8,329,092 | B2 | 12/2012 | Fuwa et al. |
| 8,974,727 | B2 | 3/2015 | Abe et al. |
| 9,073,264 | B2 | 7/2015 | Abe et al. |
| 2002/0041818 | A1 | 4/2002 | Abe et al. |
| 2003/0062655 | A1 | 4/2003 | Lohner et al. |
| 2008/0286139 | A1 | 11/2008 | Abe et al. |
| 2011/0123383 | A1 | 5/2011 | Fuwa et al. |
| 2012/0251378 | A1 | 10/2012 | Abe et al. |
| 2013/0075575 | A1 | 3/2013 | Abe et al. |

FOREIGN PATENT DOCUMENTS

| | | |
|---|---|---|
| CN | 102029389 | 4/2011 |
| CN | 102574333 | 7/2012 |
| CN | 102939177 | 2/2013 |
| DE | 10148967 | 4/2002 |
| EP | 2281677 | 2/2011 |
| JP | 01-502890 | 10/1989 |
| JP | 10-044248 | 2/1998 |
| JP | 10-044270 | 2/1998 |
| JP | 2000-073108 | 3/2000 |
| JP | 2001-87977 | 4/2001 |
| JP | 2002-115004 | 4/2002 |
| JP | 2004-506097 | 2/2004 |
| JP | 2004-082556 | 3/2004 |
| JP | 2006-124733 | 5/2006 |
| JP | 2008-106319 | 5/2008 |
| JP | 2008-291315 | 12/2008 |
| JP | 2008-291317 | 12/2008 |
| JP | 2010-280173 | 12/2010 |
| WO | 88/02677 | 4/1988 |

OTHER PUBLICATIONS

Search Report issued by E.P.O. patent office in E.P.O. Patent Application No. 14823771.2, dated Oct. 14, 2015.
Japan Office action, mail date is May 7, 2014 with English Language Translation.
Search report from PCT/JP2014/068847, mail date is Oct. 14, 2014 with English Language Translation.
Search report from PCT/JP2014/068846, mail date is Oct. 14, 2014 with English Language Translation.
U.S. Appl. No. 14/439,494.
Korean Office Action mailed Jul. 17, 2015 with respect to Korean Patent Application No. 10-2015-7011171.
Search Report issued by E.P.O. patent office in E.P.O. Patent Application No. 14822306.8, dated Dec. 15, 2015.
International Preliminary Report on Patentability for PCT/JP2014/068846, mailed Jan. 12, 2016.
International Preliminary Report on Patentability for PCT/JP2014/068847, mailed Jan. 12, 2016.
Office Action issued in China Counterpart Patent Appl. No. 201480002866.4, dated Nov. 4, 2015, along with an english translation thereof.

\* cited by examiner

Concept of portion to be suction-removed (Suction plane is assumed to be upper surface plane of solidified layer formed most immediately before suction removal)

[Suction device for verification test]

Cyclone collector

Condition of verification test
- Inner diameter of hose: φ6 (Outer diameter: φ8)
- Length of hose: 10m
- Suction amount: 20L/min (Suction by cyclone collector)
- Feed rate of nozzle: 500-2000 mm/s
- Single scanning
- Rib width: 0.4-0.8 mm
- Gap: 0.5-1.0 mm

[Results of verification test]

Layer contour "h1" : Height of solidified layer immediately before surface-machining process
Layer contour "h2" : Deepest insertion level of machining tool upon surface-machining process Occurring of stress onto tool due to powder interposition Influence on surface accuracy by machining performed within the powder layer

METHOD FOR MANUFACTURING THREE-DIMENSIONAL SHAPED OBJECT

TECHNICAL FIELD

The present invention relates to a method for manufacturing a three-dimensional shaped object. More particularly, the present invention relates to a method for manufacturing a three-dimensional shaped object with a plurality of solidified layers stacked integrally by repeating the step of forming the solidified layer by irradiating a predetermined portion of a powder layer with a light beam.

BACKGROUND OF THE INVENTION

Heretofore, a method for manufacturing a three-dimensional shaped object by irradiating a powder with a light beam has been known (such method can be generally referred to as "selective laser sintering method"). Such method can produce the three-dimensional shaped object by repeating the following steps (i) and (ii):

(i) forming a solidified layer by irradiating a predetermined portion of a powder layer with a light beam, thereby allowing a sintering of the predetermined portion of the powder or a melting and subsequent solidification thereof; and (ii) forming another solidified layer by newly forming a powder layer on the resulting solidified layer, followed by similarly irradiating the powder layer with the light beam. See JP-T-01-502890 or JP-A-2000-73108, for example.

The three-dimensional shaped object thus obtained can be used as a metal mold in a case where inorganic powder material such as a metal powder and a ceramic powder is used as the powder material. While on the other hand, the three-dimensional shaped object can be used as a model or replica in a case where organic powder material such as a resin powder and a plastic powder is used as the powder material. This kind of technology makes it possible to produce the three-dimensional shaped object with a complicated contour shape in a short period of time.

By way of the case wherein the metal powder is used as the powder material, and the three-dimensional shaped object is used as the metal mold, the selective laser sintering method will be described. As shown in FIGS. 1A and 1B, a powder layer 22 with a predetermined thickness "t1" is firstly formed on a base plate 21 (see FIG. 1A) and then a predetermined portion of the powder layer 22 is irradiated with a light beam to form a solidified layer 24 (see FIG. 1B). Then, another powder layer 22 is newly provided on the solidified layer 24 thus formed, and is irradiated again with the light beam to form another solidified layer. In this way, the solidified layers are repeatedly formed, making it possible to produce a three-dimensional shaped object with a plurality of the solidified layers 24 stacked integrally. The lowermost solidified layer can be formed in a state of being adhered to the surface of the base plate. Therefore, the three-dimensional shaped object and the base plate are mutually integrated. The integrated "three-dimensional shaped object" and "base plate" can be used as the metal mold as they are.

The three-dimensional shaped object obtained by the laser-beam irradiation has a relatively roughened surface. In general, the shaped object has the roughened surface Rz of several hundred micrometers. This is attributed to the fact that the surface of the solidified layer has the adhered powder. When the solidified layer is formed, the energy of the laser beam is changed into heat, which causes the irradiated powder particles to melt. The melted powder particles are fused with each other during the subsequent cooling step thereof. In this regard, the temperature can rise in the surrounding powder region of the irradiated point, and thus such surrounding powder tends to adhere to the surface of the solidified layer. This adherence of the powder causes the roughened surface of the three-dimensional shaped object, and thereby a machining processing of the surface is necessary. Specifically, the surface of the obtained three-dimensional shaped object is wholly required to be subjected to a machining process.

PATENT DOCUMENTS

Related Art Patent Documents

PATENT DOCUMENT 1: Japanese Unexamined Patent Application Publication No. H01-502890
PATENT DOCUMENT 2: Japanese Unexamined Patent Application Publication No. 2000-73108

DISCLOSURE OF THE INVENTION

Problems to be Solved by the Invention

With respect to the selective laser sintering method, the inventors of the present application have found that the presence of the powder around the shaped object can tend to cause a trouble in chipping or breakage of the machining tool (see FIG. 17A). While not intending to be bound by any specific theory, one of the presumed reasons of the chipping or breakage of the machining tool is that an interposition of the powder between the machining tool and the surface of the shaped object increases the stress on the machining tool.

Furthermore, the inventors of the present application have found such a phenomenon that the presence of the powder around the shaped object can cause an unnecessary stress on the surface of the shaped object, and thereby impairing a smoothness of the surface of the shaped object (see FIG. 17B). It is presumed that one of reasons for this phenomenon is also attributed to the interposition of the powder between the machining tool and the surface of the shaped object Under these circumstances, the present invention has been created. That is, an object of the present invention is to provide the selective laser sintering method which is capable of reducing the trouble in chipping or breakage of the machining tool and the like.

Means for Solving the Problems

In order to achieve the above object, one embodiment of the present invention provides a method for manufacturing a three-dimensional shaped object by repetition of a powder-layer forming and a solidified-layer forming, based on the following steps (i) and (ii), the method being characterized by the following features (a)-(c):

(i) forming a solidified layer by irradiating a predetermined portion of a powder layer with a light beam, thereby allowing a sintering of the powder in the predetermined portion or a melting and subsequent solidification thereof; and (ii) forming another solidified layer by newly forming a powder layer on the resulting solidified layer, followed by the irradiation of a predetermined portion of the powder layer with the light beam;

(a) the method includes at least one step of a surface-machining process for machining a surface of the solidified layer and/or the shaped object by a machining device at a point in time after the formation of the solidified layer and/or the manufacturing of the shaped object;

(b) a suction removal of the powder located around the solidified layer and/or the shaped object is performed by a suction nozzle prior to the surface-machining process; and (c) the powder is locally removed in the suction removal in consideration of a lowermost machinable level of the machining tool.

In a preferred embodiment, the suction nozzle during the local removal of the powder is operated under such a condition that a movement path of the suction nozzle is a path along the followings (a) to (c):

(a) a contour "A" of a cross section of the solidified layer positioned at the lowermost machinable level of the machining tool;

(b) a contour "B" of an upper surface of the solidified layer formed most immediately before the suction removal; and (c) a region "C" obtained by subtracting a closed region "B'" from a closed region "A'", the closed regions "A'" and "B'" being respectively obtained by a planar projection of the contours "A" and "B" with respect to the same plane, the planar projection being provided in a stacking direction of the solidified layers (or powder layer).

As for the operation for the movement of the suction nozzle, a horizontal movement of the suction nozzle may be performed above the powder layer formed most immediately before the suction removal. For example, the horizontal movement of the suction nozzle may be provided under such a condition that a spaced distance between the powder layer and the tip level of the suction nozzle is within 5 mm, the powder layer being a layer formed most immediately before the suction removal.

The movement of the suction nozzle may be offset from the above contours. Namely, the suction nozzle during the local removal of the powder may be operated under such a condition that the movement path of the suction nozzle is the path along:

a contour "A'" offset from the contour "A";

a contour "B'" offset from the contour "B"; and the region "C".

An amount of the offset may be determined according to a nozzle size of the suction nozzle and/or a tool diameter of the machining tool.

Effect of the Invention

In accordance with an embodiment of the present invention, the powder located around the solidified layer and/or the shaped object can be removed by suction prior to the surface-machining process, and thereby making it possible to reduce the trouble in chipping or breakage of the machining tool, the chipping or breakage being attributed to the interposition of the powder between the machining tool and the surface of the shaped object. Furthermore, an embodiment of the present invention can reduce the interposition of the powder between the machining tool and the surface of the shaped object, and thereby reducing the stress applied on the surface of the shaped object during the machining process. This leads to an improved smoothness of the surface of the shaped object.

The suction removal of the powder by the suction nozzle can be performed only for the local region of the powder layer. Such local removal of the powder is effective, and is unlikely to have an adverse impact on the manufacturing time of the three-dimensional shaped object. In particular, the movement path of the suction nozzle can be readily provided in consideration of the lowermost machinable level of the machining tool, and thereby making it possible to achieve a more efficient suction removal of the powder.

MODES FOR CARRYING OUT THE INVENTION

Figure 1A:
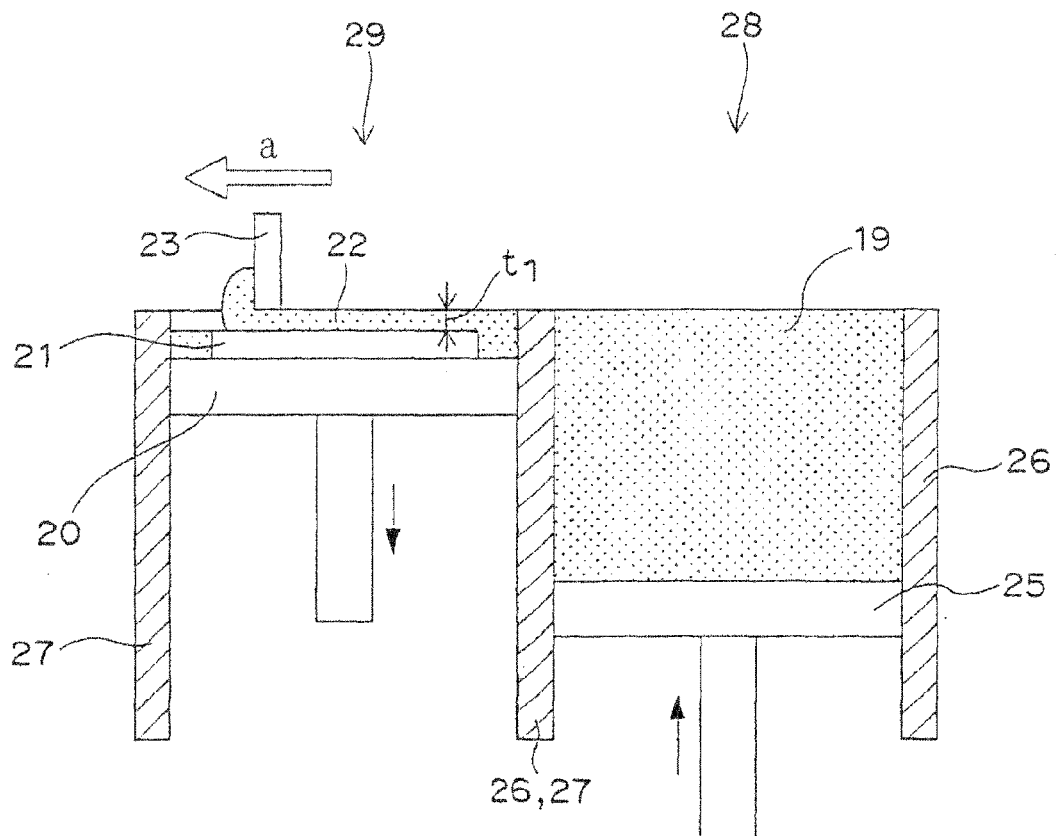
FIGS. 1A and 1B are cross-sectional views for explaining a selective laser sintering method.

An embodiment of the present invention will be described in more detail with reference to the accompanying drawings. It should be noted that configurations/forms and dimensional proportions in the drawings are merely for illustrative purposes, and thus not the same as those of the actual parts or elements.

The term "powder layer" as used in this description and claims means, for example, "metal powder layer made of a metal powder" or "resin powder layer made of a resin powder". Also, the term "predetermined portion of a powder layer" substantially means a portion of a three-dimensional shaped object to be manufactured. Therefore, a powder existing in such predetermined portion is irradiated with a light beam, whereby, the powder undergoes a sintering or a melting and subsequent solidification thereof to form a shape of a three-dimensional shaped object. Furthermore, the term "solidified layer" substantially means "sintered layer" when the powder layer is a metal powder layer, whereas term "solidified layer" substantially means "cured layer" when the powder layer is a resin powder layer.

The term "upper" as used in this description and claims substantially means a stacking direction of the solidified layers upon the manufacturing of the shaped object. While on the other hand, term "lower" as used in this description and claims substantially means the reverse direction to the upper direction. Namely, the lower direction corresponds to a vertical lower direction.

[Selective Laser Sintering Method]

First, a selective laser sintering method, on which an embodiment of the manufacturing method of the present invention is based, will be described. For convenience, the selective laser sintering method, which will be described, is one where a powder material is supplied from a storage tank therefor, followed by being flattened by means of a squeegee blade to form a powder layer therefrom. Moreover, by way of example, the selective laser sintering method wherein a machining process is additionally carried out with respect to the shaped object (i.e., the method embodiment as shown in FIG. 2A, not FIG. 2B) will be described. FIGS. 1A, 1B, 3 and 4 show functions and constructions of a laser sintering hybrid milling machine for enabling an execution of the selective laser sintering method as well as a machining process. The laser-sintering/mil ling hybrid machine 1 is mainly provided with a powder layer former 2, a forming table 20, a base plate 21, a light-beam irradiator 3, and a machining means 4. The powder layer forming means 2 is a means for forming a powder layer by providing a powder such as a metal powder or a resin powder in a predetermined thickness. The forming table 20 is a table capable of vertically elevating/descending by cylinder drive in a forming tank 29 whose outer periphery is surrounded with a wall 27. The base plate 21 is a plate for shaped object, which is disposed on the forming table 20 and serves as a platform of the shaped object. The light-beam irradiator 3 is a means for irradiating a desired position with an emitted light beam L. The machining means 4 is a means for milling the surface of the shaped object, especially the side surface of the shaped object.

Figure 1B:
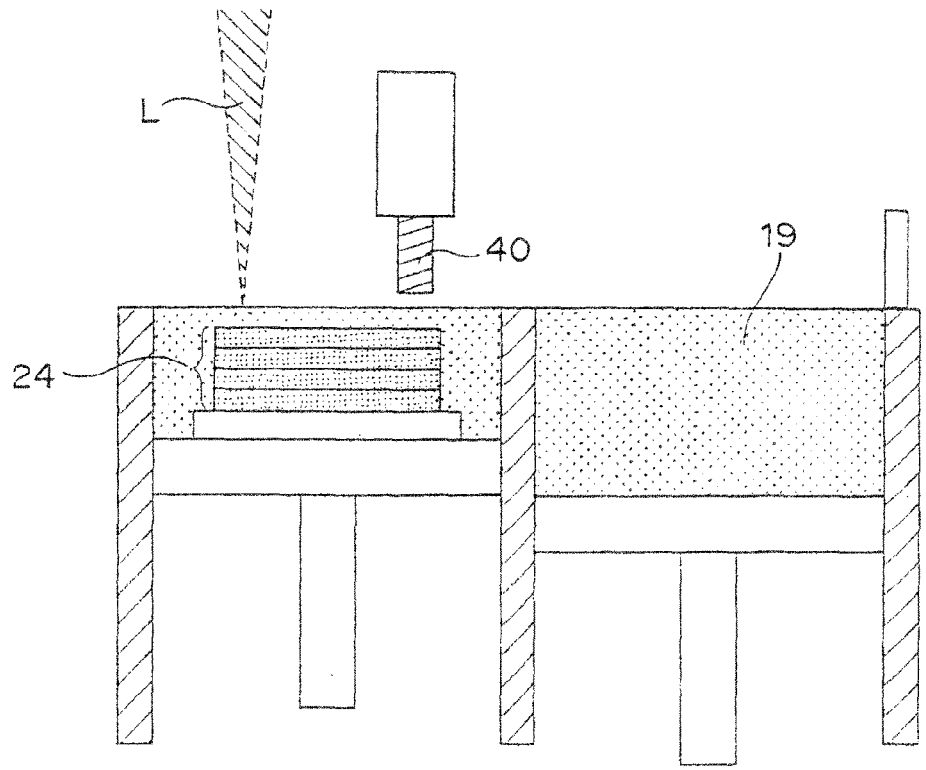
Figure 2A:
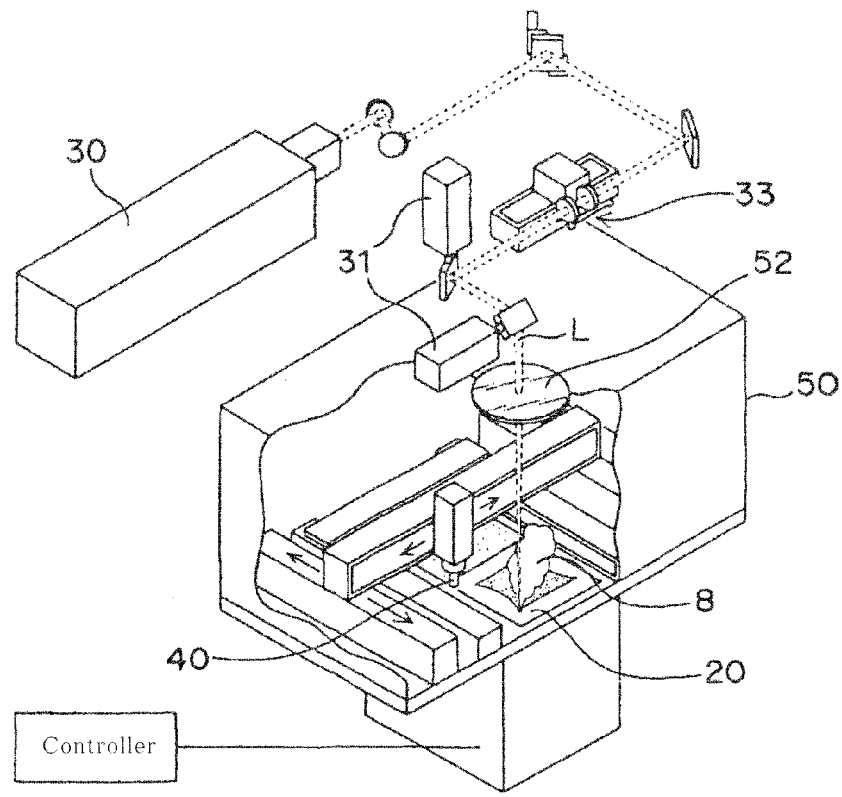
FIGS. 2A and 2B are perspective views schematically illustrating a device for performing a selective laser sintering method wherein FIG. 2A especially shows a laser-sintering/machining hybrid machine with a machining mechanism, and FIG. 2B especially shows a device with no machining mechanism.
Figure 2B:
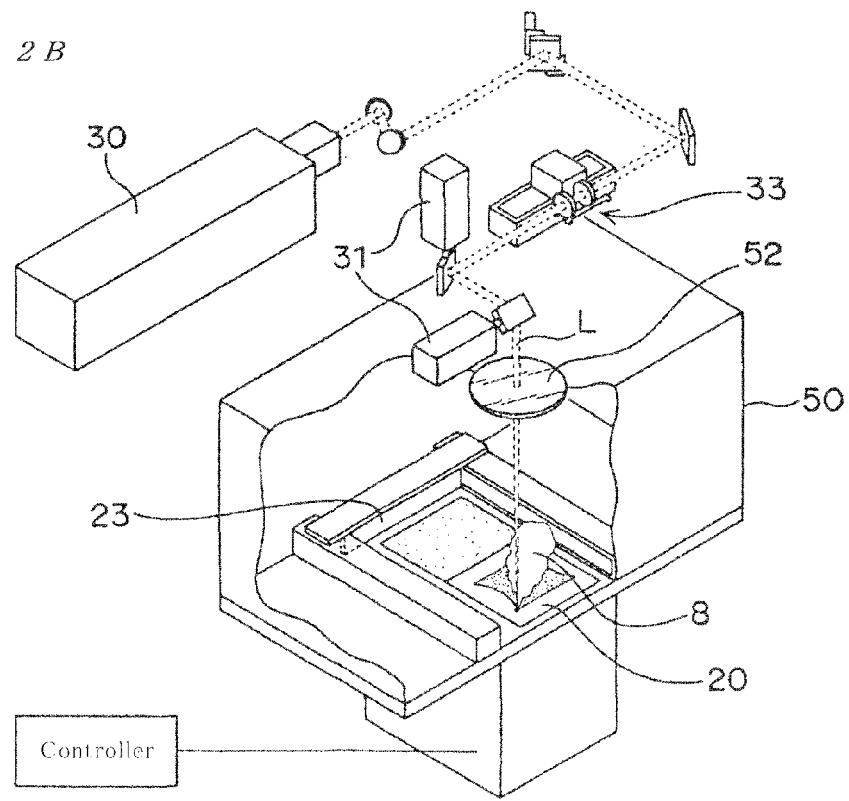
Figure 3:
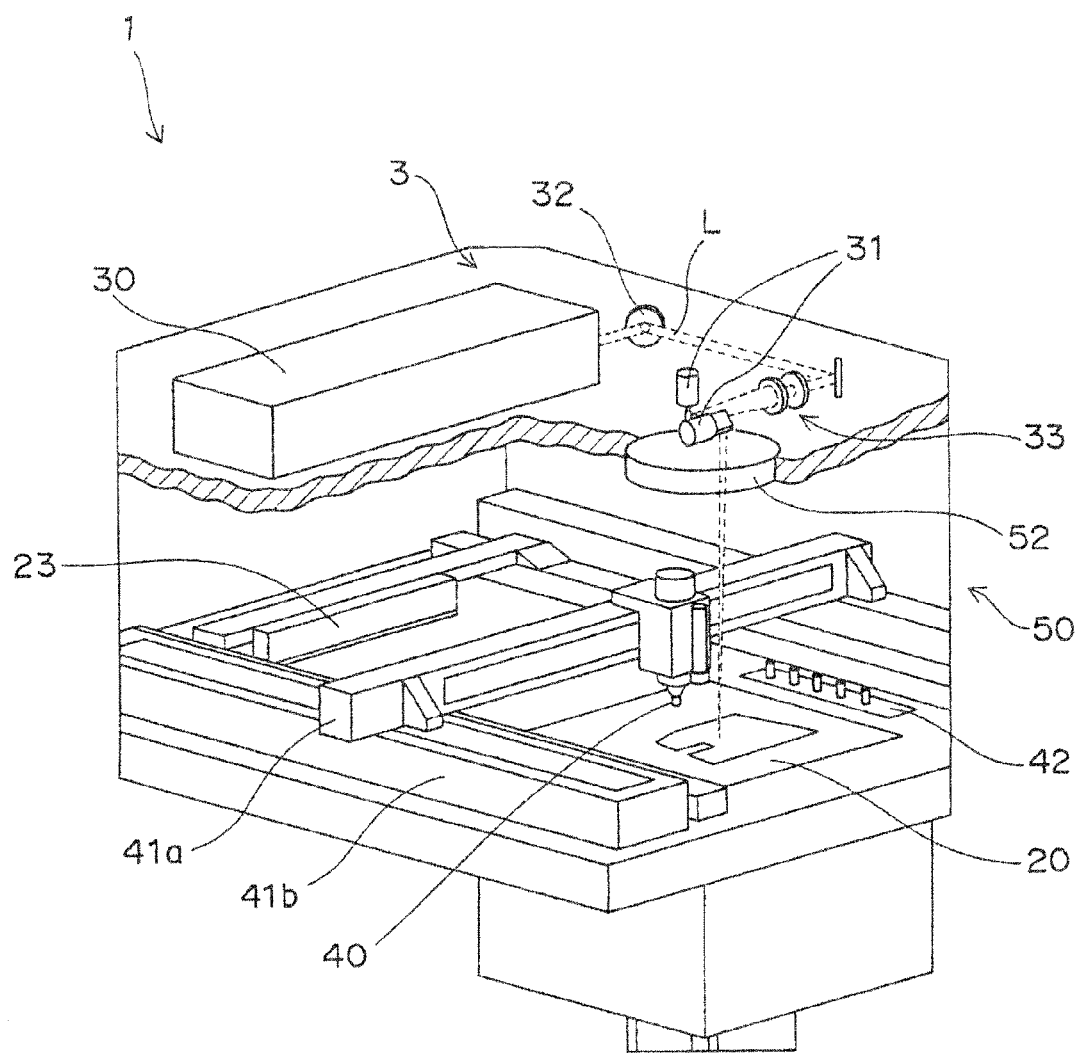
FIG. 3 is a perspective view schematically showing an embodiment in which a selective laser sintering method is carried out.
Figure 4:
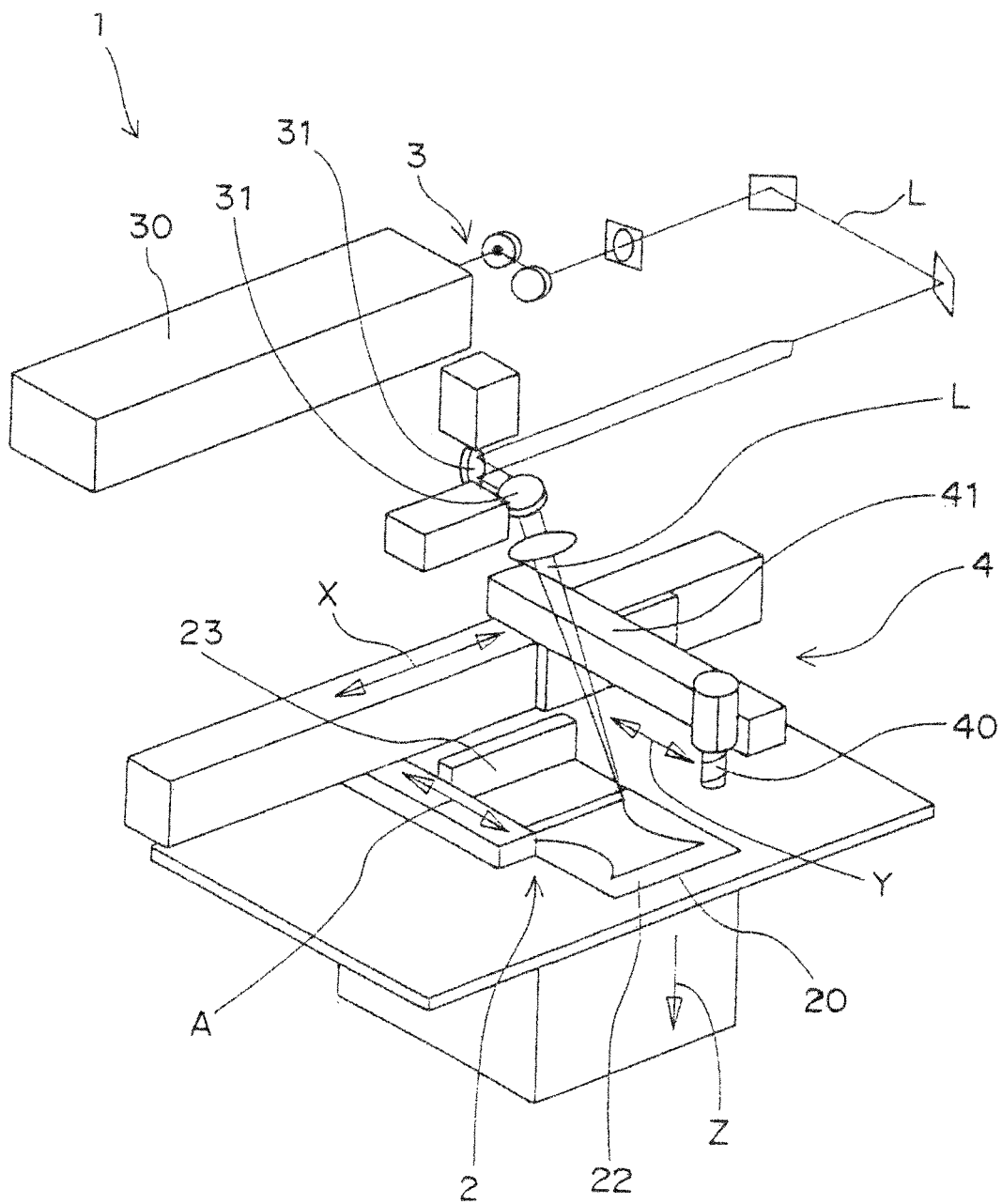
FIG. 4 is a perspective view schematically showing a construction of a machine (laser-sintering/machining hybrid machine) by which the surface machining process as well as a selective laser sintering method is carried out.

As shown in FIGS. 1A and 1B, the powder layer former 2 is mainly composed of a "powder table 25 capable of vertically elevating/descending by cylinder drive in a storage tank for powder material 28 whose outer periphery is surrounded with a wall 26" and a "squeegee blade 23 for forming a powder layer 22 on the base plate for shaped object". As shown in FIGS. 3 and 4, the light-beam irradiator 3 is mainly composed of a "light beam generator 30 for emitting a light beam L" and a "galvanometer mirror 31 (i.e., scan optical system) for scanning a light beam L onto a powder layer 22". Optionally, the light-beam irradiation means 3 is equipped with a beam shape correcting means for correcting a shape of a light beam spot (e.g., a means composed of a pair of cylindrical lens and a rotation drive mechanism for rotating the lens around a shaft line of the light beam) and fθ lens. The machining means 4 is mainly composed of a "milling head 40 for milling the peripheral face of a shaped object" and a "X-Y actuator 41 (41a, 41b) for driving the milling head 40 to move toward the position to be milled" (see FIGS. 3 and 4).

Figure 5:
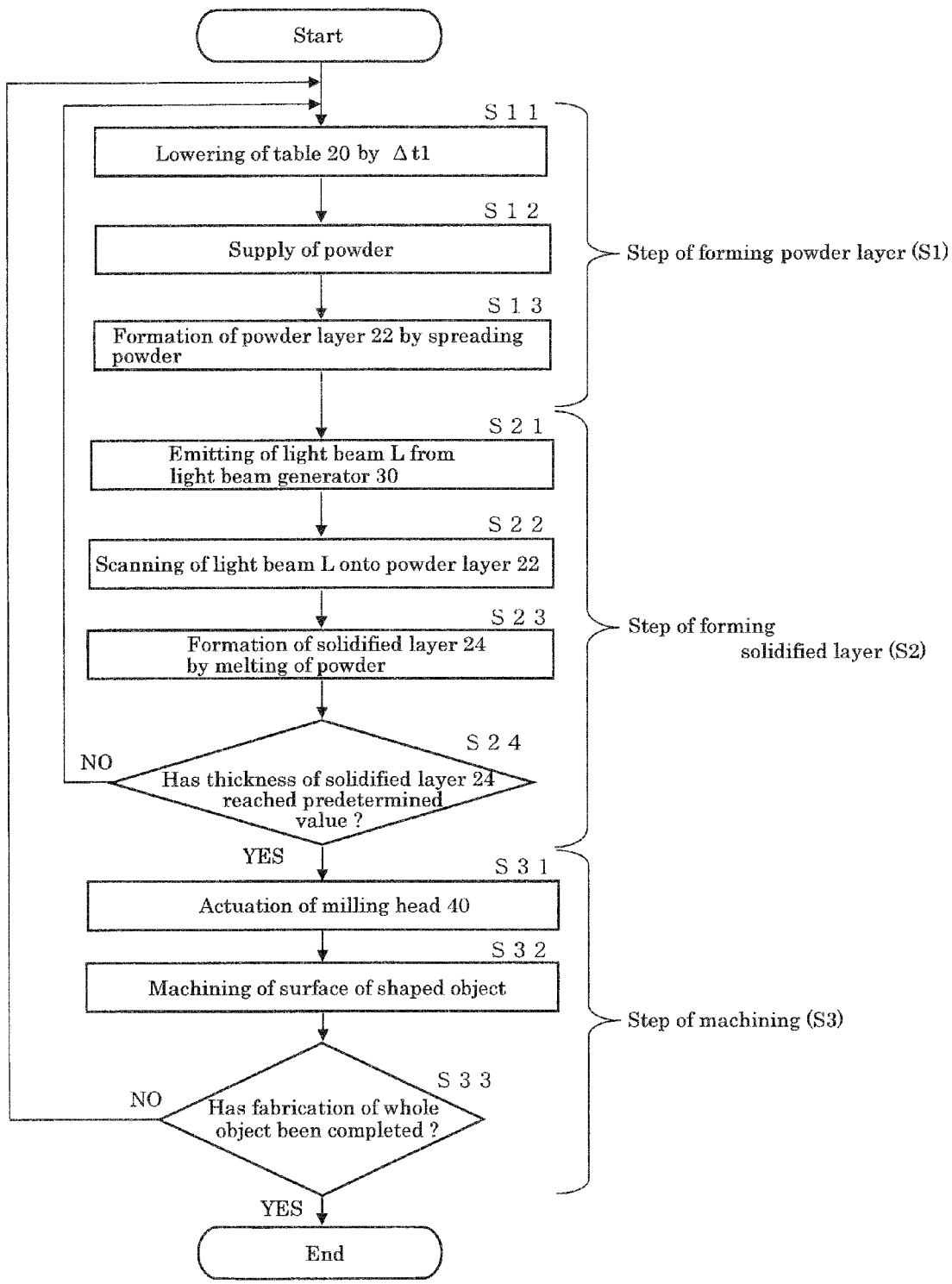
FIG. 5 is a flow chart of operations of a laser-sintering/machining hybrid machine.
Figure 6:
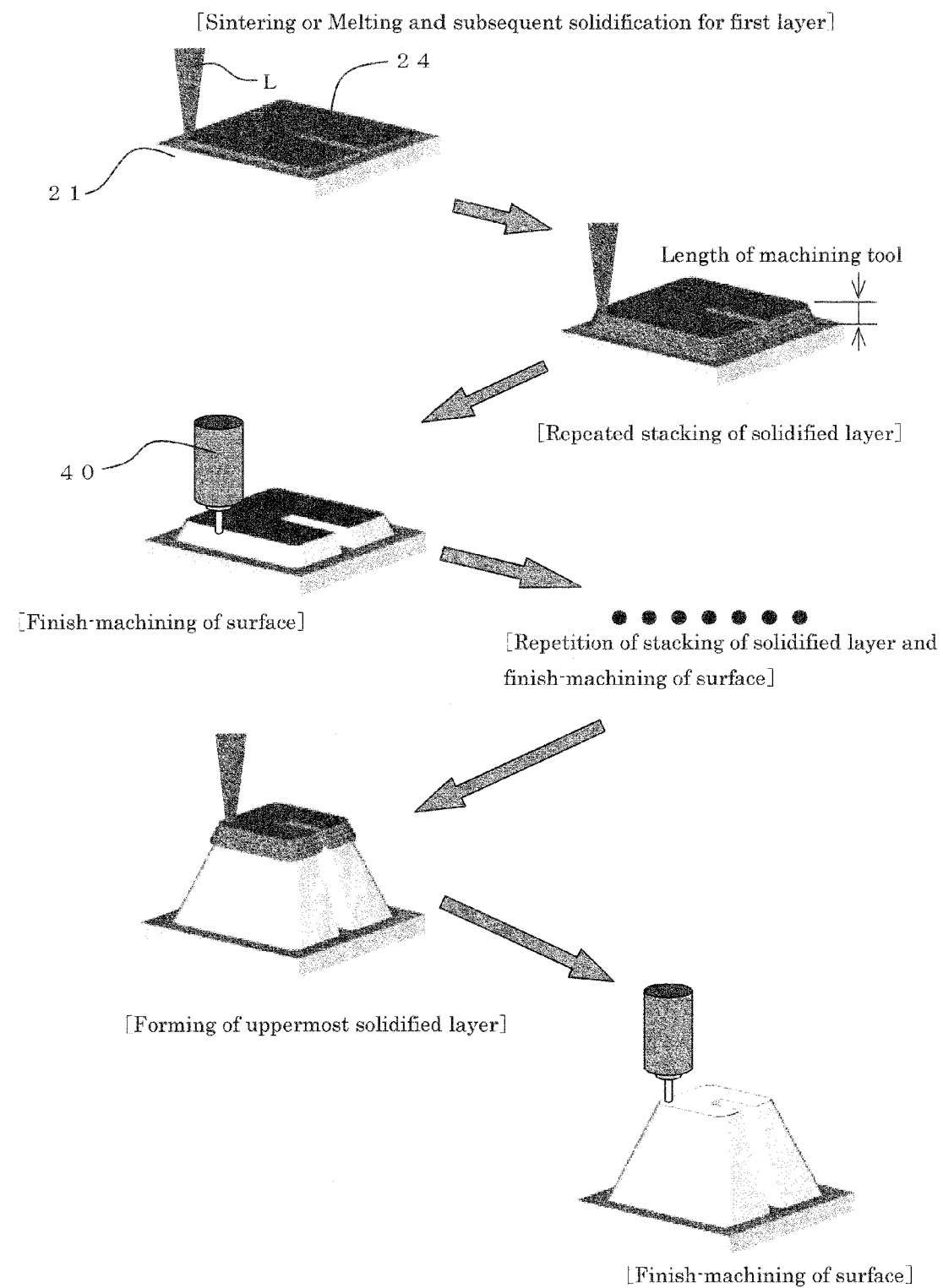
FIG. 6 includes schematic views showing a laser-sintering/machining hybrid process over time.

Operations of the laser sintering hybrid milling machine 1 will be described in detail with reference to FIGS. 1A, 1B, 5 and 6. FIG. 5 shows a general operation flow of a laser sintering hybrid milling machine. FIG. 6 schematically and simply shows a laser-sintering/machining hybrid process.

The operations of the laser sintering hybrid milling machine are mainly composed of a powder layer forming step (S1) of forming a powder layer 22; a solidified layer forming step (S2) of irradiating the powder layer 22 with a light beam L to form a solidified layer 24; and a machining step (S3) of milling a surface of a shaped object. In the powder layer forming step (S1), first, the forming table 20 is descended by Δt1 (S11). Subsequently, a powder table 25 is elevated by Δt1, and thereafter the squeegee blade 23 is driven to move in the direction of arrow "a" as shown in FIG. 1A. This enables a powder placed on the powder table 25 to be spread to form a powder layer 22 in a predetermined thickness Δt1 (S13), while being transferred onto the base plate 21 (S12). Examples of powder include an "iron powder having a mean particle diameter of about 5 μm to 100 μm" and a "powder having a mean particle diameter of about 30 μm to 100 μm, such as a powder of nylon, polypropylene or ABS". Following this step, the solidified layer forming step (S2) is performed. In the solidified layer forming step, a light beam L is emitted from the light beam generator 30 (S21) and then a light beam L is scanned onto a desired position of the powder layer 22 by means of the galvanometer mirror 31 (S22). The scanned light beam can cause the powder to be melted and then solidified, resulting in a formation of the solidified layer 24 integrated with the base plate 21 (S23). Examples of the light beam include carbon dioxide gas laser (about 500 W), Nd:YAG laser (about 500 W), fiber laser (about 500 W) and ultraviolet light. There is no limitation on transmission of the light beam in air, and the light beam may also be transmitted through an optical fiber or the like.

The powder layer forming step (S1) and the solidified layer forming step (S2) are repeatedly performed until the thickness of the stacked layers 24 reaches such a predetermined value that is determined based on a tool length of the milling head 40 (see FIG. 1B). Upon a sintering of the powder or a melting and subsequent solidification of the powder, the newly stacked solidified layer is integrated with the solidified layer which has already been formed and located therebeneath.

When the thickness of the stacked solidified layers 24 reaches a predetermined thickness, the surface machining step (S3) is initiated. In the embodiments as shown in FIGS. 1B and 6, the milling head 40 is actuated to initiate execution of the machining step (S31). For example, in a case where the tool (ball end mill) of the milling head 40 has a diameter of 1 mm and an effective milling length of 3 mm, a milling with a milling depth of 3 mm can be performed. Therefore, when Δt1 is 0.05 mm, the milling head 40 is actuated when sixty solidified layers are formed. The milling head 40 is moved in X and Y directions by means of the X-Y actuator 41 (41a, 41b) and the shaped object composed of stacked solidified layers 24 is subjected to the surface machining (S32). When the entire three-dimensional shaped object has not yet been manufactured, the step returns to the powder layer forming step (S1) Thereafter, the steps S1 through S3 are repeatedly performed to further stack the solidified layers 24, which leads to a manufacturing of the desired three-dimensional shaped object (see FIG. 6).

An irradiation path of the light beam L in the solidified layer forming step (S2) and a milling path in the surface machining step (S3) are determined in advance using 3-D CAD data. In this case, the machining path is determined by applying contour line processing. For example, in the solidified layer forming step (S2), the contour shape data of each of sliced sections, which are regularly-pitched (e.g., 0.05 mm pitch when Δt1 is 0.05 mm) sliced sections of STL data produced from a 3-D CAD model, are used.

[Manufacturing Method of the Present Invention]

An embodiment of the present invention is characterized by features associated with the surface-machining process performed during the selective laser sintering method as described above.

Figure 7:
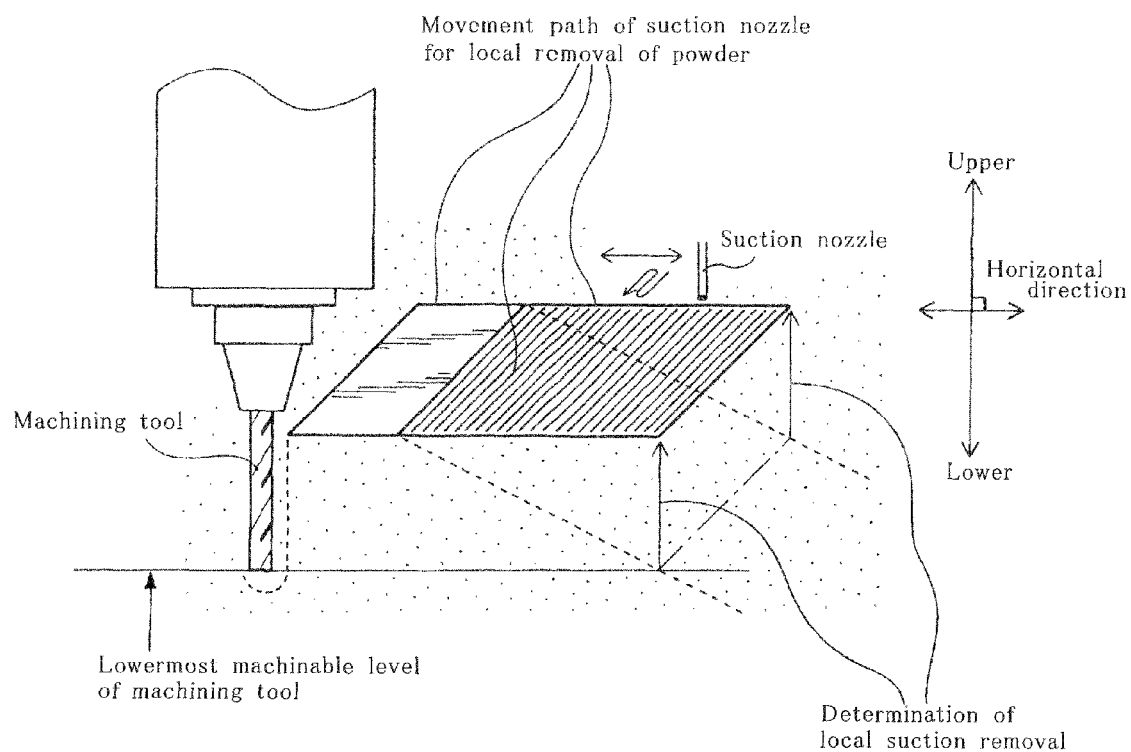
FIG. 7 is a schematic view showing a general concept according to an embodiment of the present invention.

The manufacturing process according to an embodiment of present invention includes at least one step of a surface-machining process for machining a surface (especially "side surface") of the solidified layer and/or the shaped object by a machining tool at a point in time after the formation of the solidified layer and/or the manufacturing of the shaped object. Prior to the surface-machining process, a suction removal of the powder located around the solidified layer and/or the shaped object is performed by a suction nozzle. In particular, the limited powder is locally removed in the suction removal in consideration of a lowermost machinable level of the machining tool, the limited powder being locally positioned around the solidified layer and/or the shaped object. See FIG. 7.

The suction nozzle is forced to move to perform the suction removal of the powder around the shaped object, in which case the movement path (movement locus) of the suction nozzle is determined in consideration of the lowermost machinable level of the machining tool.

Figure 8:
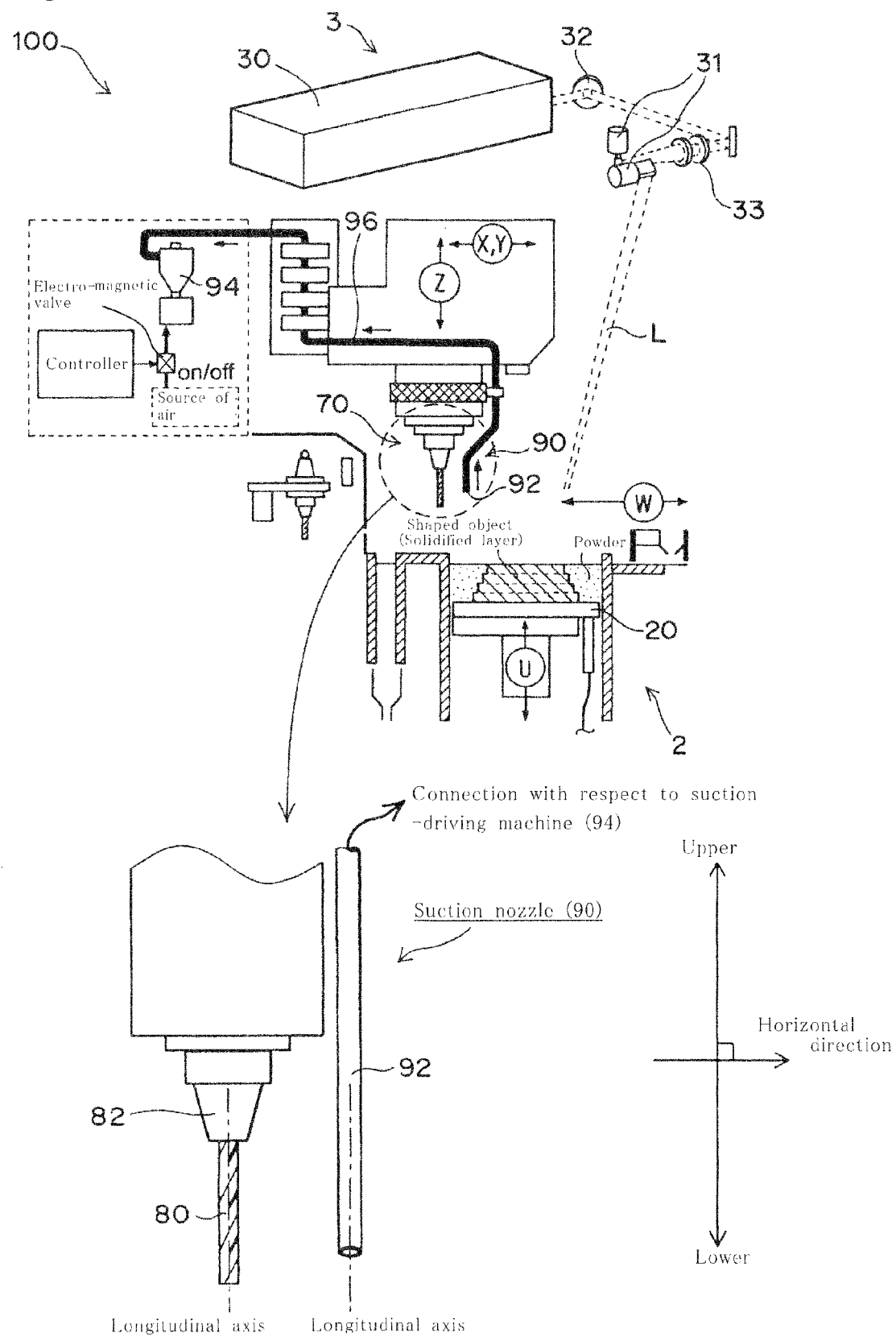
FIG. 8 includes schematic views showing an arrangement between a machining tool and a suction nozzle.

The machining tool is a tool capable of performing a surface-machining process with respect to the side surface of the solidified layer, i.e., the surface of the shaped object (especially "side surface" of the shaped object). As shown in FIG. 8, the machining tool 80 is a tool attached to the tooling 82, for example. The machining tool of the machining device may be an end mill. As the end mill, a twin bladed ball end mill made of a superhard material, a square end mill, a radius end mill or the like may be used, for example.

The term "lowermost machinable level of the machining tool" used herein means the lower most level of the level range of the machining tool (especially, vertical level range of the machining tool in the stacking direction of solidified layers) in which the side surface of the solidified layer/shaped object can be subjected to the machining process. In other words, assuming that the machining tool is inserted from above into the powder layer around the solidified layer/shaped object, the deepest inserted level of the machining tool corresponds to "lowermost machinable level". From another viewpoint, the lowermost machinable level of the machining tool is equivalent to the tip level or lower end level of the machining tool during the surface-machining process.

The term "suction nozzle" used herein means a device capable of suctioning the powder of the powder layer in the broad sense. Because of "nozzle", the suction nozzle preferably has a form of cylinder (especially "narrow cylinder") at its suction port. In this regard, the suction nozzle in an embodiment of the present invention can be referred to as "cylindrical suction device". As shown in FIG. 8 for example, the suction nozzle 90 is composed at least of a narrow cylindrical part 92 and a suction-driving machine 94 connected thereto.

The suction removal of the powder is performed prior to the surface-machining process, in which case it is preferred that the suction nozzle is horizontally moved, for example. The movement of the suction nozzle is provided with no substantial change of the height level of the nozzle (i.e., vertical positioning level of the suction nozzle in the stacking direction of the solidified layers). In other words, the movement of the suction nozzle, which is performed above the powder layer and/or the solidified layer formed most immediately before the suction removal, is not changed in terms of its spaced distance from the powder layer and/or the solidified layer in the vertical direction.

As shown in FIG. 8, the machining tool 80 and the suction nozzle 90 are positioned adjacent to each other. Specifically, as shown in FIG. 8, the machining tool 80 and the suction nozzle 90 are preferably positioned adjacent to each other such that the axis of the machining tool 80 (i.e., longitudinal axis thereof) and the axis of the suction nozzle 90 (i.e., longitudinal axis of the narrow cylindrical part 92). In this case where the suction nozzle and the machining tool are positioned adjacent to each other, the suction nozzle is provided for the suction removal with the suction nozzle and the machining tool being next to each other.

In an embodiment of the present invention, the horizontal movement path (horizontal movement locus) of the suction nozzle is determined from the lowermost machinable level of the machining tool. Namely, the movement path of the suction nozzle during the suction removal of the powder is obtained from the lowermost machinable level. In particular, due to the local removal of the powder, the movement path of the suction nozzle is minimum necessary path for the surface-machining process. This means that the lowermost machinable level is suitably used to give such minimum necessary path for the surface-machining process.

Figure 9:
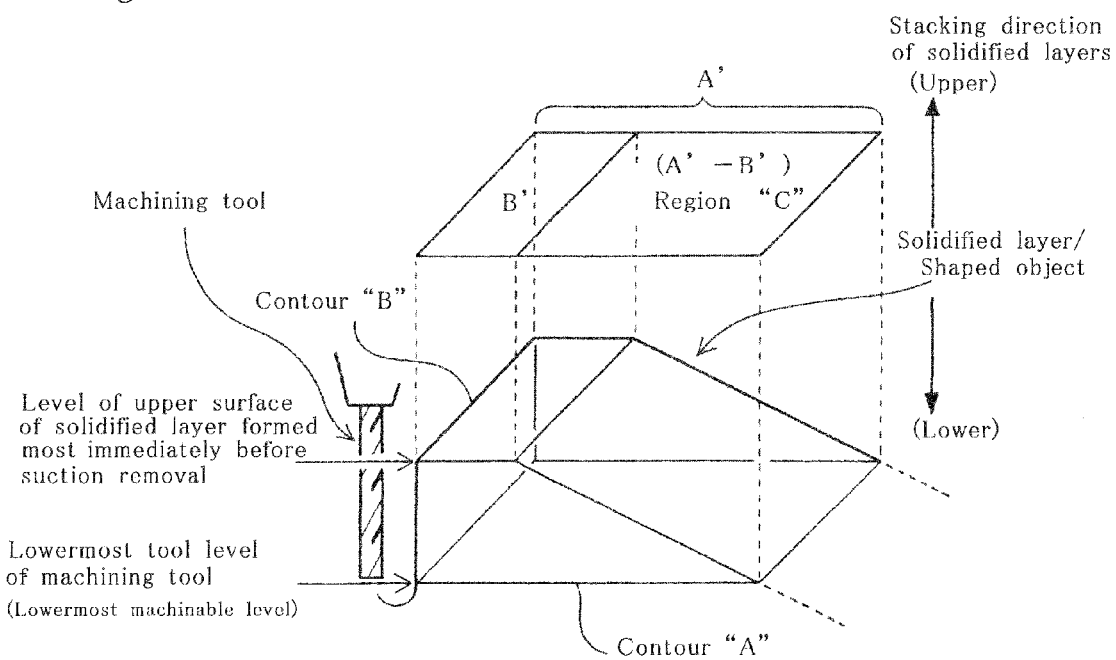
FIG. 9 includes schematic views for explaining a movement path (movement locus) of the suction nozzle along a contour "A", a contour "B" and a region "C".
Figure 9:
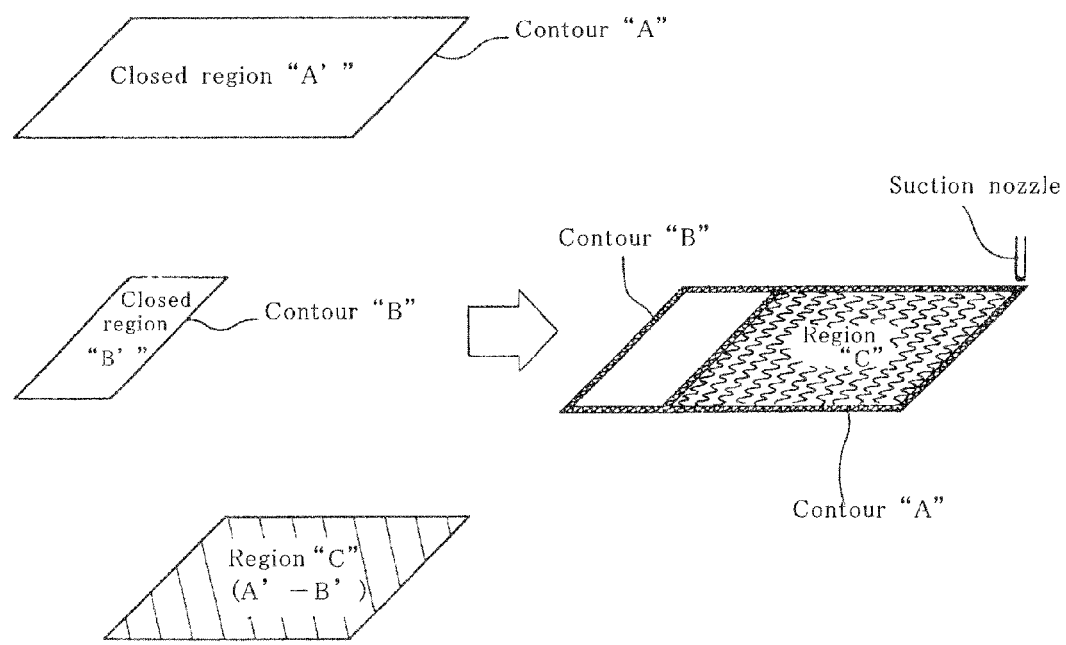

For example, the movement path of the suction nozzle may be a path along the following contours "A" and "B" and region "C" (see FIG. 9):

(a) the contour "A" of a cross section of the solidified layer positioned at the lowermost machinable level of the machining tool;

(b) the contour "B" of an upper surface of the solidified layer formed most immediately before the suction removal; and (c) the region "C" obtained by subtracting a closed region "B'" from a closed region "A'", the closed regions "A'" and "B'" being respectively obtained by a planar projection of the contours "A" and "B" with respect to the same plane, the planar projection being provided in a stacking direction of the solidified layers.

In this case, the suction nozzle is moved to remove only the local powder in such a manner that the movement path of the suction nozzle is a path along the contours "A" and "B" and region "C".

The contour "A" is a contour line of the cross-section of the solidified layer (the cross-section of the solidified layer taken along the horizontal direction), the section being positioned at the lowermost machinable level of the machining tool. As seen from FIG. 9, the contour "A" corresponds to a contour line of the cross-section of the solidified layer, such cross-section being positioned at the deepest inserted level of the machining tool.

The contour "B" is a contour line of the upper surface of the solidified layer formed most immediately before the suction removal. As seen from FIG. 9, the contour "B"

corresponds to a contour line of uppermost surface of the final solidified layer at a point in time of the surface-machining process.

The region "C" is a local region obtained by subtracting a closed region "B'" from a closed region "A'", the closed regions "A'" and "B'" being provided by shifting the contours "A" and "B" to the same plane (x-y plane) without a change of their horizontal positions. In a case where the three-shaped object is finally used for a metal mold, the shaped object generally has a tapered form in the stacking direction toward the upper side thereof due to so-called "draft angle". As such, the size of the "closed region "B'" is smaller than that of the closed region "A'", and also the "closed region "B'" is located on the inner side of the closed region "A'" in the above same plane.

Such movement path can be readily obtained from the contour of the solidified layer, the contour being especially provided in consideration of the lowermost machinable level. Namely, the movement path of the suction nozzle for the local removal of the powder can be obtained without no complex calculations.

Figure 10:
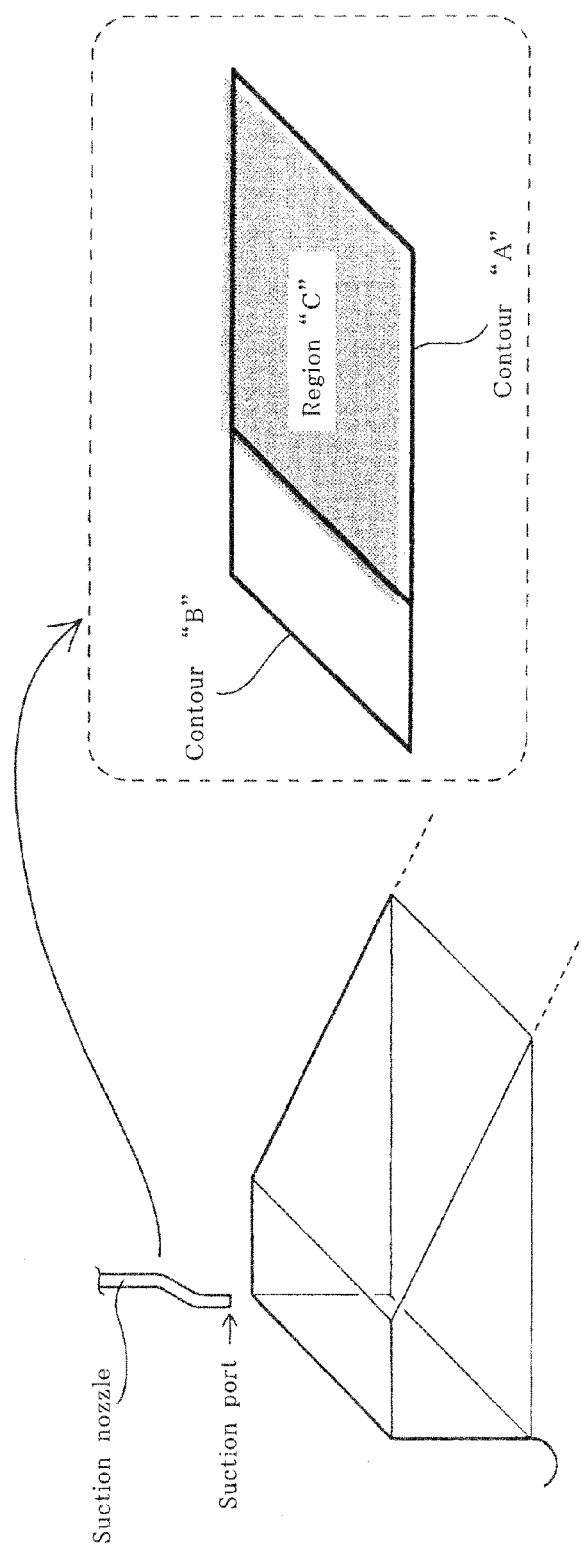
FIG. 10 includes schematic views for explaining a movement path (movement locus) of the suction nozzle along a contour "A", a contour "B" and a region "C".
Figure 11A:
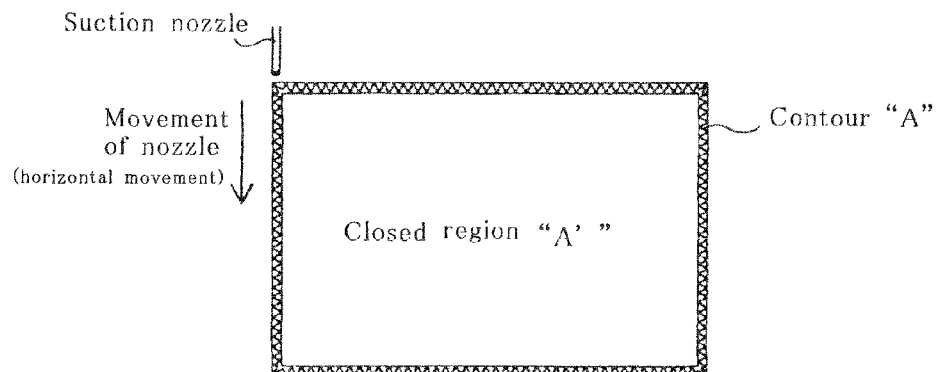
FIGS. 11A-11D are schematic views showing a region to be removed by suction from above the solidified layer/shaped object.
Figure 11B:
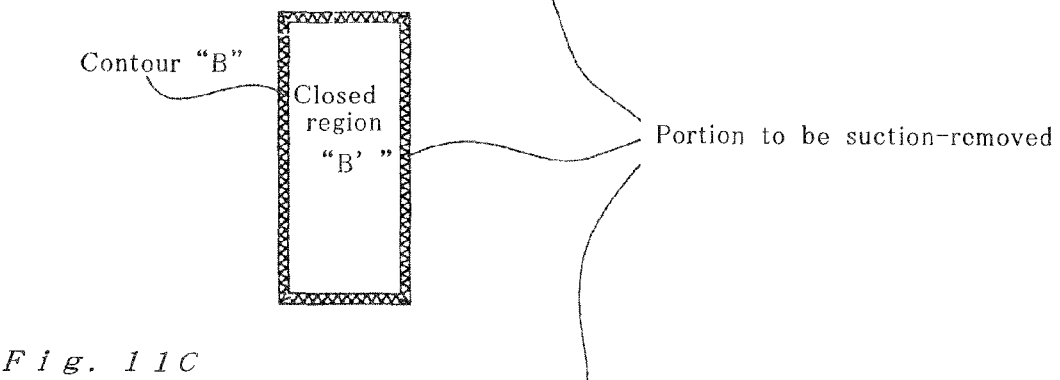
Figure 11C:
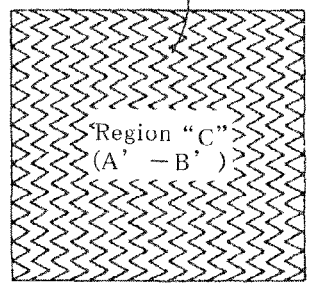
Figure 11D:
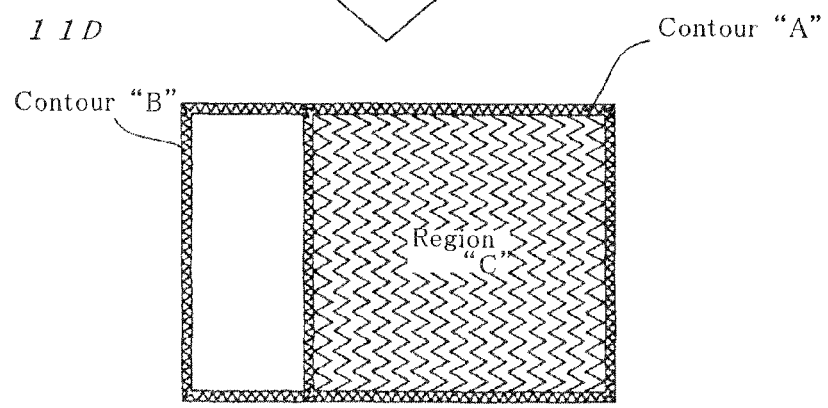

As described above, the suction nozzle is horizontally moved, in which case the horizontal movement path of the suction nozzle is a path along the contours "A" and "B" and region "C". This means that the track of the suction port of the horizontally-moving suction nozzle is along the contours "A" and "B" and region "C" (see FIGS. 9 and 10). More specifically, the movement of the suction nozzle is operated to achieve the local removal of the powder under only the following conditions:

The suction nozzle moves horizontally such that the suction port of the suction nozzle traces the contour "A" (in particular, contour line shifted from the contour "A" in the stacking direction with no change of its horizontal position)

The suction nozzle moves horizontally such that the suction port of the suction nozzle traces the contour "B" (in particular, contour line shifted from the contour "B" in the stacking direction with no change of its horizontal position); and The suction nozzle moves horizontally such that the suction port of the suction nozzle traces the region "C" (in particular, contour line shifted from the region "C" in the stacking direction with no change of its horizontal position) As for the region "C", the suction nozzle is forced to horizontally move such that the track of the suction port of the suction nozzle fills in the region "C" (in particular, contour line shifted from the region "C" in the stacking direction with no change of its horizontal position). By way of example, a reciprocal motion of the suction nozzle with a gradual shift of its horizontal position is provided such that the track of the suction port of the suction nozzle fills in the above region "C".

Figure 12:
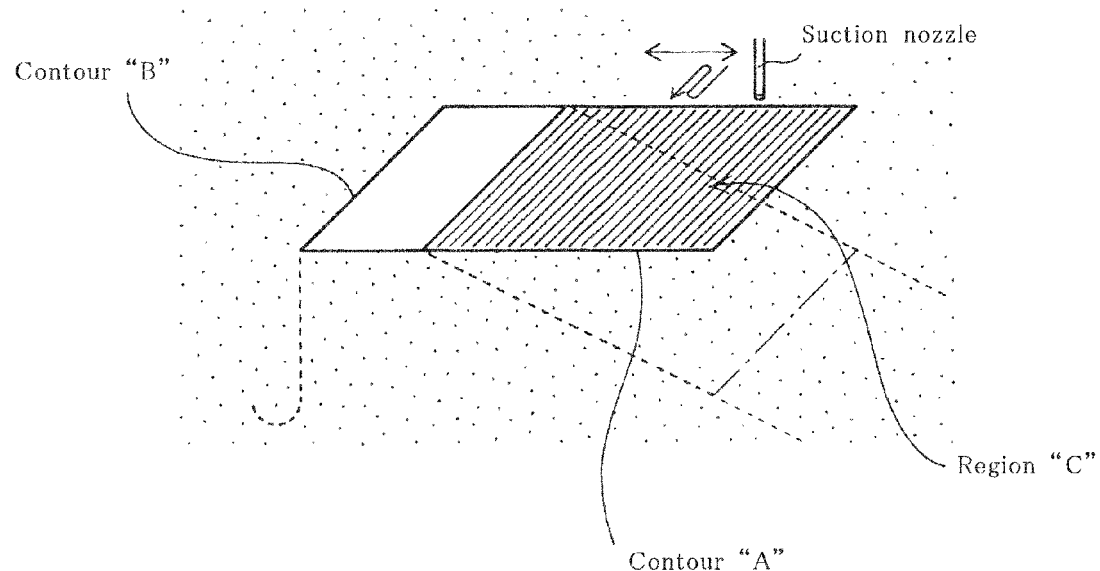
FIG. 12 is a schematic view showing a region to be removed by suction when the suction plane is assumed to be an upper surface plane of the solidified layer most immediately before the suction removal.

FIGS. 11A-11D schematically shows the region to be removed by suction when seen from above the solidified layer/shaped-object. As seen from FIGS. 11A-11D, the powder region to be subjected to the suction removal by the suction nozzle corresponds to only the local region (see FIG. 11D) positioned along the contour "A" (see FIG. 11A), the contour "B" (see FIG. 11B), and the region "C" (see FIG. 11C). See also FIG. 12.

Figure 13:
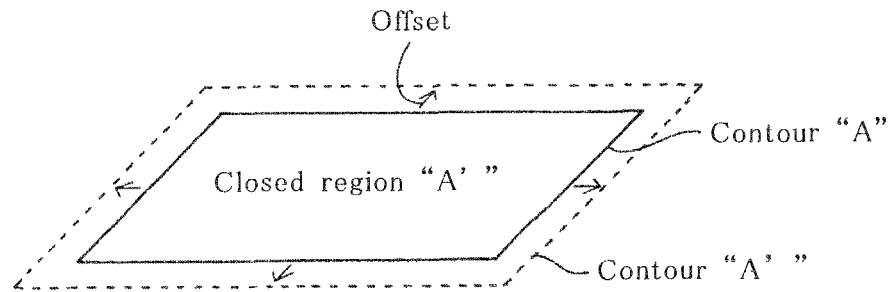
FIG. 13 includes schematic views showing an offset embodiment of the movement path of the suction nozzle.
Figure 13:
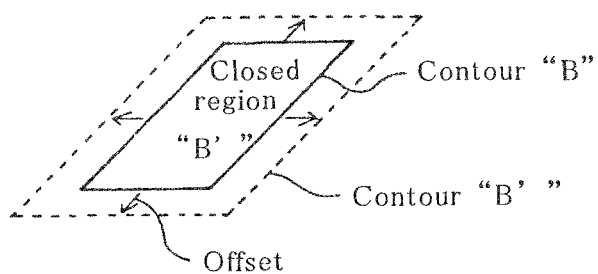
Figure 13:
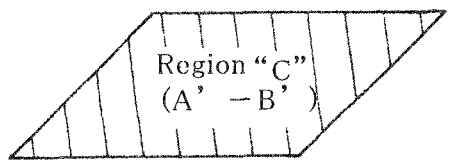
Figure 13:
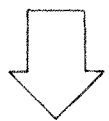
Figure 13:
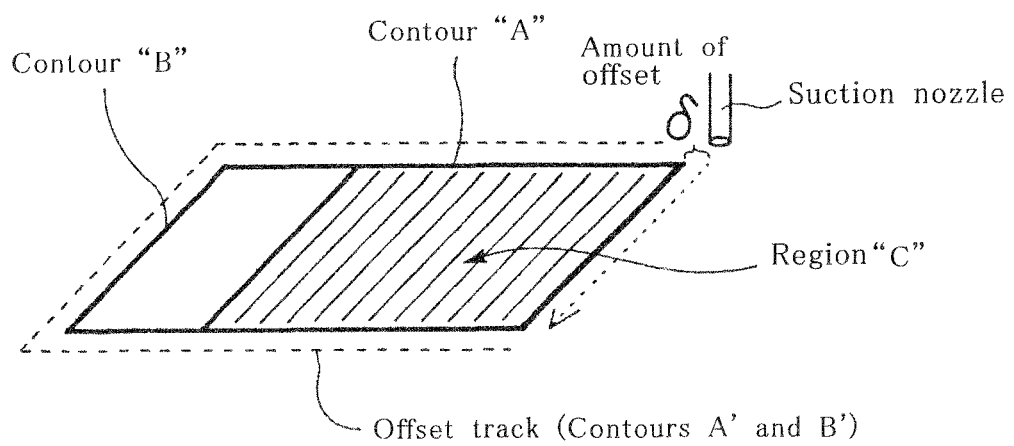

The movement path of the suction nozzle may be offset path by a predetermined distance (in the horizontal direction). Specifically, the suction nozzle during the local removal of the powder may be operated under such a condition that the movement path of the suction nozzle is the path along a contour "A'" offset from the contour "A", a contour "B'" offset from the contour "B", and the region "C" (see FIG. 13). This means that a peripheral portion of the movement path of the suction nozzle, the portion being in the outer periphery thereof, may be offset toward outside, in which case the offset is not needed for the overlap portion between the contours "A" and "B". The offset of the movement path can provide an effective suction with respect to the nearby powder region which is located adjacent to the side surface of the solidified layer/shaped object, which leads to a more effective suction removal. The local powder around the side surface of the shaped object is required to be removed in the powder removal process, in which case the offset of the movement path according to an embodiment of the present invention can provide an effective suction with respect to the local region positioned slightly outside from the side surface of the shaped object.

Figure 14:
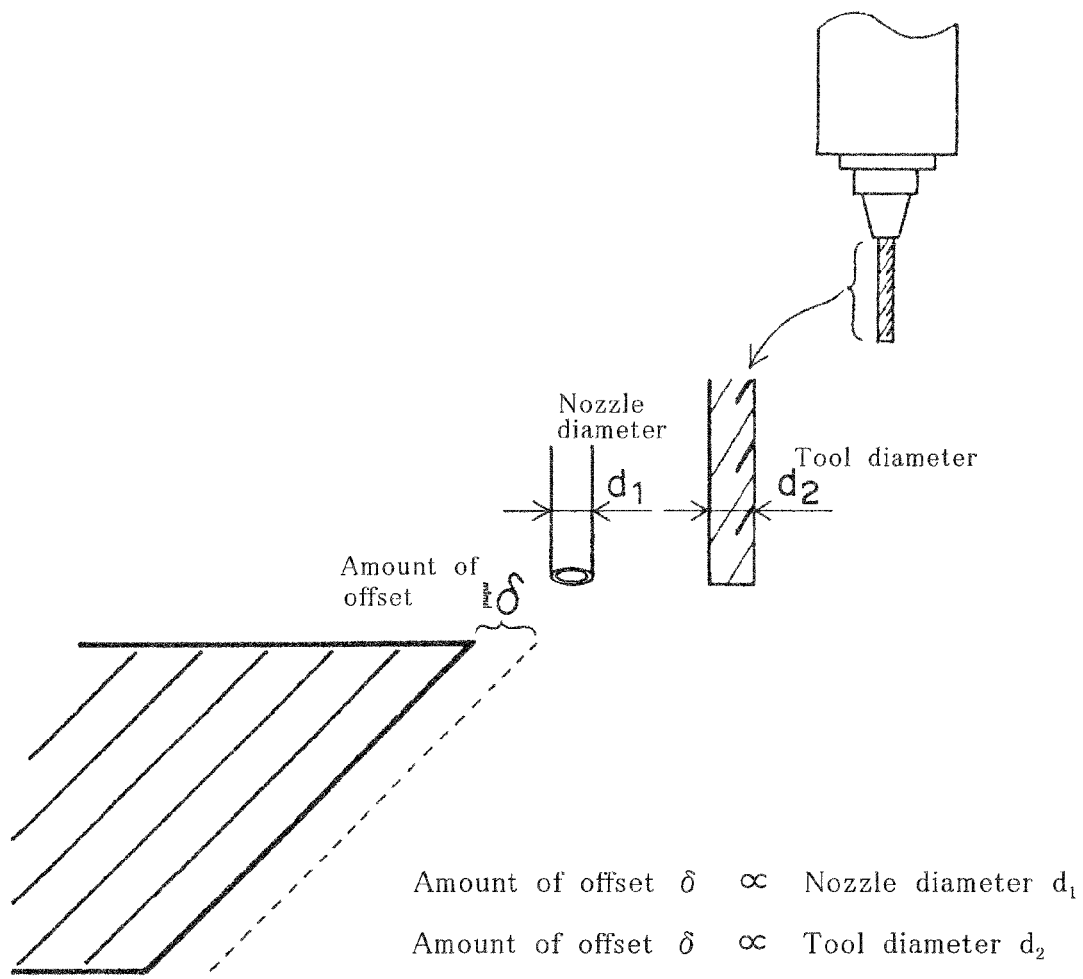
FIG. 14 is a schematic view showing an embodiment wherein an amount of the offset may be determined according to a nozzle size and/or tool diameter.

It is preferred that the extent of the offset, i.e., the amount of the offset is determined according to the nozzle size of the suction nozzle and/or the tool diameter of the machining tool. Namely, the amount of the offset preferably depends on the nozzle size of the suction nozzle and/or the tool diameter of the machining tool. For example, the larger nozzle diameter $d_1$ the nozzle has, the larger the offset amount $\delta$ may be (see FIG. 14). While on the other hand, the smaller nozzle diameter $d_1$ the nozzle has, the smaller the offset amount may be (see FIG. 14). By way of example, in a case where the nozzle diameter $d_1$ is in the range of 1.8 mm to 10 mm, the offset amount may be half thereof, i.e., in the range of 0.9 mm to 5 mm, in which case the offset path may correspond to the track $T_{center}$ of the center axis of the suction nozzle. The offset amount $\delta$ may be increased or decreased from the range of 0.9 mm to 5 mm, depending on whether the nozzle diameter $d_1$ of the suction nozzle is larger or smaller than the range of 1.8 mm to 10 mm. Similarly, the larger tool diameter $d_2$ the machining tool has, the larger the offset amount d may be (see FIG. 14). While on the other hand, the smaller tool diameter $d_2$ the machining tool has, the smaller the offset amount $\delta$ may be (see FIG. 14). By way of example, in a case where the tool diameter $d_2$ of the machining tool is in the range of 0.5 mm to 3 mm, the offset amount may be half thereof, i.e., in the range of 0.25 mm to 1.5 mm, in which case the offset path may correspond to the track $T_{center}$ of the center axis of the suction nozzle. The offset amount $\delta$ may be increased or decreased from the range of 0.25 mm to 1.5 mm, depending on whether the tool diameter $d_2$ of the machining tool is larger or smaller than the range of 0.5 mm to 3 mm.

Figure 15:
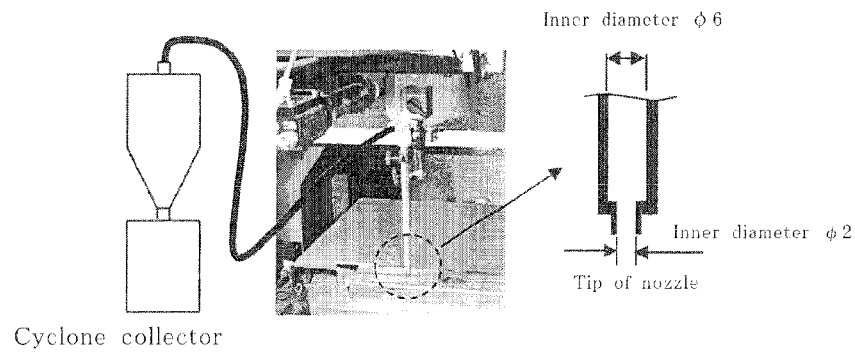
FIG. 15 includes illustrations and graph for explaining an experimental result associated with an embodiment of the present invention.
Figure 15:
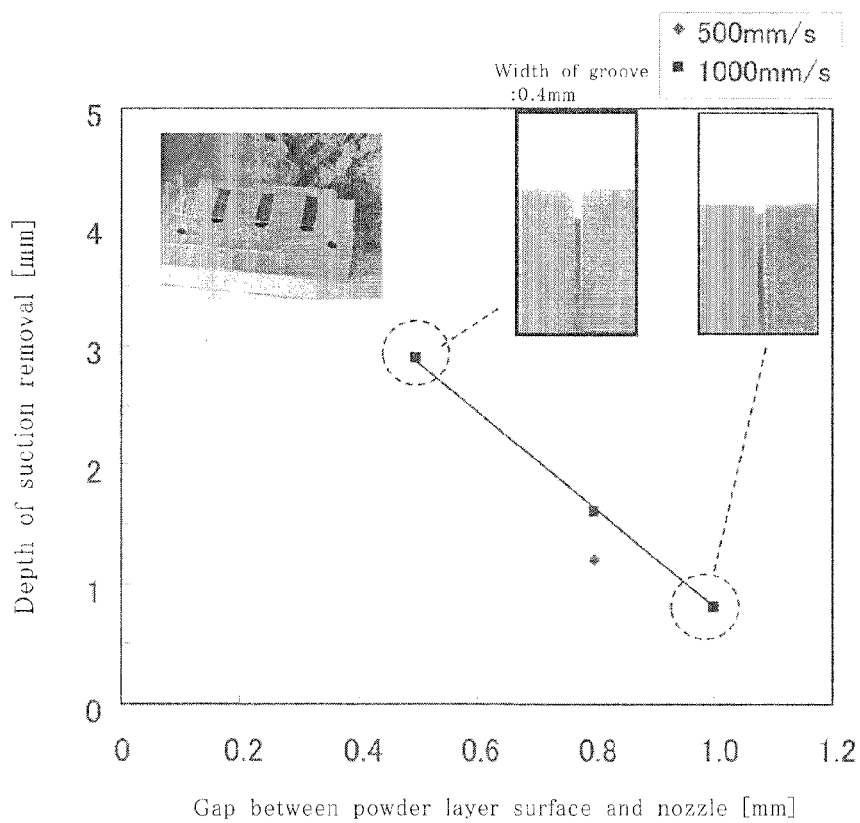

In an embodiment of the present invention, the suction removal may be performed under such a condition that the spaced distance between the tip level of the suction nozzle (suction port) and the powder layer formed most immediately before the suction removal has a suitably adjusted distance. For example, the spaced distance in the stacking direction between the tip level of the suction nozzle (suction port) and the powder layer is preferably within 5 mm, i.e., preferably in the range of 0 mm (excluding 0 mm) to 5 mm, the powder layer being a layer formed most immediately before the suction removal. Such spaced distance is more preferably within 1 mm, i.e., preferably in the range of 0 mm (excluding 0 mm) to 1 mm, and most preferably in the range of 0.4 mm to 1.0 mm. As proven in FIG. 15, this makes it possible to effectively remove the powder located around the solidified layer due to the moving suction nozzle being nearer to the powder layer formed most immediately before the suction removal. It should be noted that an upper surface of "powder layer formed most immediately before the suction removal" and an upper surface of "solidified layer formed most immediately before the suction removal" are approximately flush with each other. As such, the spaced distance between the tip level of the suction nozzle (suction port) and the powder layer formed most immediately before the suction removal has the same meaning as that of the spaced distance between the tip level of the suction nozzle (suction port) and the solidified layer formed most immediately before the suction removal.

When the horizontal movement of the suction nozzle is provided during the suction removal according to an embodiment of the present invention, suction conditions such as suction amount and moving speed of the nozzle can be changed depending on the thickness/depth of the powder region to be suctioned. By way of example, when the thickness of the powder region to be suctioned is larger, i.e., the depth of the powder region to be suctioned is larger, the larger suction amount of the suction nozzle may be provided. Similarly when the thickness of the powder region to be suctioned is larger, i.e., the depth of the powder region to be suctioned is larger, the lower scanning speed of the suction nozzle may be provided.

Furthermore, the suction conditions such as suction amount and moving speed of the nozzle can be changed depending on the local form of the shaped object, the local form being in proximity to the suction point. By way of example, as for the wider region of the powder layer where the powder is provided widely, i.e., more powder is provided at the surrounding region (e.g., as for the vicinity region to the outer contour of the shaped object), the larger suction amount of the suction nozzle may be provided. While on the other hand, as for the narrower region of the powder layer where the powder is provided narrowly, i.e., less powder is provided at the surrounding region (e.g., as for the vicinity region to the rib of the shaped object), the smaller suction amount of the suction nozzle may be provided. Similarly as for the wider region of the powder layer (e.g., as for the vicinity region to the outer contour of the shaped object), the lower scanning speed of the suction nozzle may be provided. While on the other hand, as for the narrower region of the powder layer where the powder is provided narrowly (e.g., as for the vicinity region to the rib of the shaped object), the higher scanning speed of the suction nozzle may be provided.

According to an embodiment of the present invention, the suction conditions can be suitably changed in consideration of "Z direction" (i.e., stacking direction), depending on the depth of the powder layer to be removed and the form of the shaped object.

The embodiment of the present invention can remove the powder located around the solidified layer and/or the shaped object by suction prior to the surface-machining process, and thereby making it possible to reduce the trouble in chipping or breakage of the machining tool, the chipping or breakage being attributed to the interposition of the powder between the machining tool and the surface of the shaped object. For example, the average period that elapses before the breakage or chipping of the machining tool occurs can increase by approximately 80 to 400%. By way of example, the time that elapses before the breakage or chipping of the machining tool occurs can increase from approximately the range of 30-50 hours to approximately the range of 140-150 hours. Furthermore, the embodiment of the present invention can reduce the interposition of the powder between the machining tool and the surface of the shaped object, and thereby also reducing the stress applied on the surface of the shaped object during the machining process. As a result, an improved smoothness of the surface of the shaped object can be achieved. For example, the surface roughness Rz in the surface-machined portion of the shaped object can become preferably 6 μm or less, more preferably 5 μm or less, and most preferably 4 μm or less. The term "surface roughness Rz" used herein substantially means a roughness measure which is obtained by adding up "height up to the uppermost mountain peak" and "depth down to the valley portion" from an average line in a roughness profile (i.e., in "cross-sectional profile of the surface of the solidified layer").

Figure 16A:
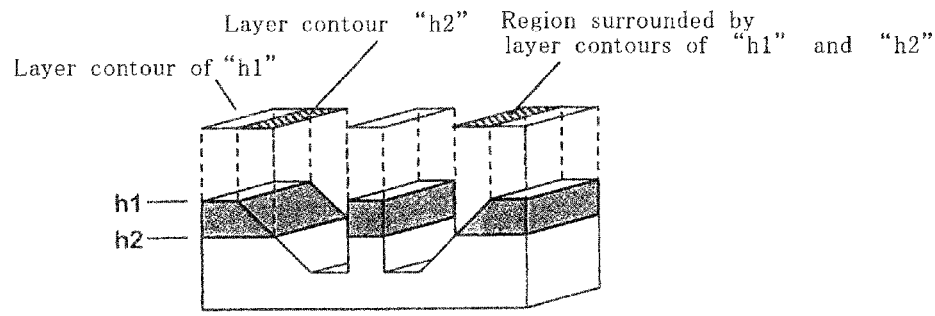
FIGS. 16A and 16B are schematic views for explaining a powder-suction path.

The program for use in an embodiment of the present invention will now be described. Specifically, the program for determining the scan path (movement path) of the suction nozzle, i.e., the program for determining the suction path will be described. In the operation of the program using the above contours "A" and "B", the contour lines of the cross section of the solidified layer at height levels $h_1$ and $h_2$ are respectively projected to the X-Y plane, and thereby a region surrounded by the projected contours "A" and "B" are extracted (see FIG. 16A). Such extraction can lead to the provision of the following suction paths 1 and 2 (i.e., paths 1 and 2 for the local removal of the powder):

(1) Suction path 1: Scan path of suction nozzle along the contour lines at height levels $h_1$ and $h_2$; and (2) Suction path 2: Scan path of suction nozzle in the region surrounded by the projected two contours wherein the scan path fills in the region with a given pitch.

Figure 16B:
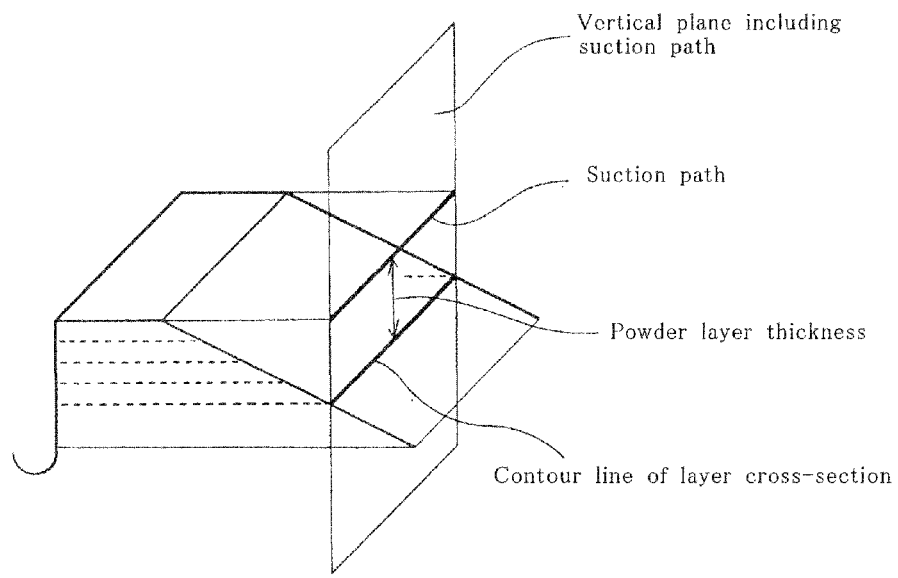
Figure 17A:
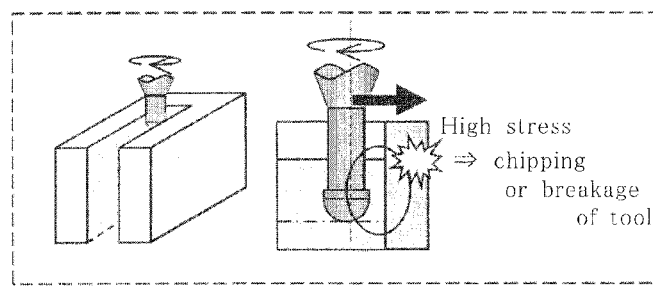
FIGS. 17A and 17B are illustrations and image showing the phenomenon found by the inventors of the present application.
Figure 17B:
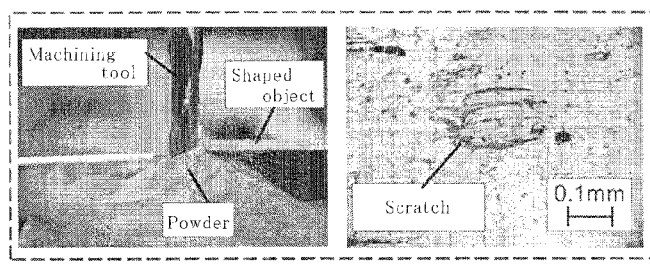

The thickness of the layer to be suctioned can be given based on the crossing between a vertical plane including the suction path and the respective contour lines (see FIG. 16B).

Although a few embodiments of the present invention have been hereinbefore described, the present invention is not limited to these embodiments. It will be readily appreciated by those skilled in the art that various modifications/additional embodiments are possible without departing from the scope of the present invention.

The removed powder by suction can be re-used for the manufacturing of the shaped object in an embodiment of the present invention. Namely, the removed powder by suction can be recycled. For example, the removed powder can be subjected to an automatic sieve process, followed by being returned to the storage tank for powder material.

The suction removal by suction nozzle can be performed upon the forming process of the solidified layer and/or the surface-machining process. Namely, the powder can be removed by suction during the forming process of the solidified layer and/or the surface-machining process. This makes it possible to remove a fume occurred upon the formation of the solidified layer. Such suction also makes it possible to additionally or alternatively remove the suspended powder and/or the chip, both of which may occur upon the surface-machining process.

The suction removal by suction nozzle can be performed with the adding of the inert gas to the chamber in an embodiment of the present invention. The reason for this is that the atmosphere gas (e.g., nitrogen-containing gas) is additionally suctioned by the suction nozzle during the suction removal, and thus the oxygen concentration of the chamber may increase. The adding of the inert gas to the chamber makes it possible to suitably keep the inert atmosphere gas in the chamber during the suction removal.

INDUSTRIAL APPLICABILITY

The manufacturing method according to an embodiment of the present invention can provide various articles. For example, in a case where the powder layer is a metal powder layer (i.e., inorganic powder layer) and thus the solidified layer corresponds to the sintered layer, the three-dimensional shaped object obtained by an embodiment of the present invention can be used as a metal mold for a plastic injection molding, a press molding, a die casting, a casting or a forging. While on the other hand in a case where the powder layer is a resin powder layer (i.e., organic powder layer) and thus the solidified layer corresponds to the cured layer, the three-dimensional shaped object obtained by an embodiment of the present invention can be used as a resin molded article.

CROSS REFERENCE TO RELATED PATENT APPLICATION

The present application claims the right of priority of Japanese Patent Application No. 2013-144280 (filed on Jul. 10, 2013, the title of the invention: "METHOD FOR MANUFACTURING THREE-DIMENSIONAL SHAPED OBJECT"), the disclosure of which is incorporated herein by reference.

EXPLANATION OF REFERENCE NUMERALS

1 Laser-sintering/machining hybrid machine
2 Powder layer former
3 Light-beam irradiator
4 Machining means
19 Powder/powder layer (e.g., metal powder/metal powder layer or resin powder/resin powder layer)
20 Forming table (i.e., supporting table)
21 Base plate for shaped object
22 Powder layer (e.g., metal powder layer or resin powder layer)
23 Squeegee blade
24 Solidified layer (e.g., sintered layer or cured layer) or three-dimensional shaped object formed thereof
25 Powder table
26 Wall of storage tank for powder material
27 Wall of forming tank
28 Storage tank for powder material
29 Forming tank
30 Light beam generator
31 Galvanometer mirror
32 Reflecting mirror
33 Collecting lens
40 Milling head
41 X-Y actuator
41a X-axis actuator
41b Y-axis actuator
42 Tool magazine
50 Chamber
52 Window for transmission of light
80 Machining tool
82 Tooling
90 Suction nozzle
92 Narrow cylindrical part of suction nozzle
94 Suction device (suction-driving machine)
96 Connecting hose
L Light beam

The invention claimed is:
1. A method for manufacturing a three-dimensional shaped object by repetition of powder-layer forming and solidified-layer forming, the repetition comprising:
(i) forming a solidified layer by irradiating a predetermined portion of a powder layer with a light beam, thereby sintering the powder in the predetermined portion or melting and subsequently solidifying of the powder; and
(ii) forming another solidified layer by newly forming a powder layer on the formed solidified layer, followed by irradiation of a predetermined portion of the newly formed powder layer with the light beam,
wherein the method includes at least a surface-machining process for machining a surface of the solidified layer and/or the shaped object by a machining tool at a point in time after the formation of the solidified layer and/or the manufacturing of the shaped object,
wherein, prior to the surface-machining process, a suction removal of the powder located around the solidified layer and/or the shaped object is performed by a suction nozzle such that the powder is locally removed, in consideration of a lowermost machinable level of the machining tool,
wherein the suction nozzle, during the local removal of the powder is operated such that a movement path of the suction nozzle is along the following paths (a) to (c):
(a) a contour "A" of a cross section of the solidified layer positioned at the lowermost machinable level of the machining tool;
(b) a contour "B" of an upper surface of the solidified layer formed most immediately before the suction removal; and
(c) a region "C" comprising a finite area region obtained by subtracting a closed region "B'" from a closed region "A'", the closed regions "A'" and "B'" being respectively obtained by a planar projection of the contours "A" and "B" with respect to the same plane, the planar projection being provided in a stacking direction of the solidified layers.
2. The method according to claim 1, wherein a horizontal movement of the suction nozzle is performed above the powder layer formed most immediately before the suction removal.
3. The method according to claim 1, wherein
a horizontal movement of the suction nozzle is performed above the powder layer formed most immediately before the suction removal; and
a distance between a tip of the suction nozzle and the powder layer is within 5 mm, the powder layer being a layer formed most immediately before the suction removal.
4. A method for manufacturing a three-dimensional shaped object by repetition of powder-layer forming and solidified-layer forming, the repetition comprising:
(i) forming a solidified layer by irradiating a predetermined portion of a powder layer with a light beam, thereby sintering the powder in the predetermined portion or melting and subsequently solidifying of the powder; and
(ii) forming another solidified layer by newly forming a powder layer on the formed solidified layer, followed by irradiation of a predetermined portion of the newly formed powder layer with the light beam,
wherein the method includes at least a surface-machining process for machining a surface of the solidified layer and/or the shaped object by a machining tool at a point in time after the formation of the solidified layer and/or the manufacturing of the shaped object,
wherein, prior to the surface-machining process, a suction removal of the powder located around the solidified layer and/or the shaped object is performed by a suction nozzle such that the powder is locally removed, in consideration of a lowermost machinable level of the machining tool, wherein the suction nozzle, during the local removal of the powder, is operated such that a movement path of the suction nozzle is along the following paths (a) to (c):

(a) a contour "A" of a cross section of the solidified layer positioned at the lowermost machinable level of the machining tool;

(b) a contour "B" of an upper surface of the solidified layer formed most immediately before the suction removal; and (c) a region "C" obtained by subtracting a closed region "B'" from a closed region "A'", the closed regions "A'" and "B'" being respectively obtained by a planar projection of the contours "A" and "B" with respect to the same plane, with contour "A'" being offset from the contour "A", the contour "A'" being provided as the contour "A" and contour "B'" being offset from the contour "B", the contour "B'" being provided as the contour "B" the planar projection being provided in a stacking direction of the solidified layers.

5. The method according to claim 4, wherein an amount of the offset is determined according to a nozzle size of the suction nozzle and/or a tool diameter of the machining tool.

6. The method according to claim 4, wherein
a horizontal movement of the suction nozzle is performed above the powder layer formed most immediately before the suction removal; and
a distance between a tip of the suction nozzle and the powder layer is within 5 mm, the powder layer being a layer formed most immediately before the suction removal.

7. The method according to claim 4, wherein a horizontal movement of the suction nozzle is performed above the powder layer formed most immediately before the suction removal.

* * * * *